No. 633,228. Patented Sept. 19, 1899.
A. CHOLODKOWSKY.
BRAKE ACTUATING DEVICE.
(Application filed June 24, 1899.)
(No Model.) 2 Sheets—Sheet 1.

Witnesses:
Frank S. Olum
Geo. S. Kennedy.

Inventor
Andre Cholodkowsky
by M. A. Rosenbaum
atty.

No. 633,228. Patented Sept. 19, 1899.
A. CHOLODKOWSKY.
BRAKE ACTUATING DEVICE.
(Application filed June 24, 1899.)
(No Model.) 2 Sheets—Sheet 2.
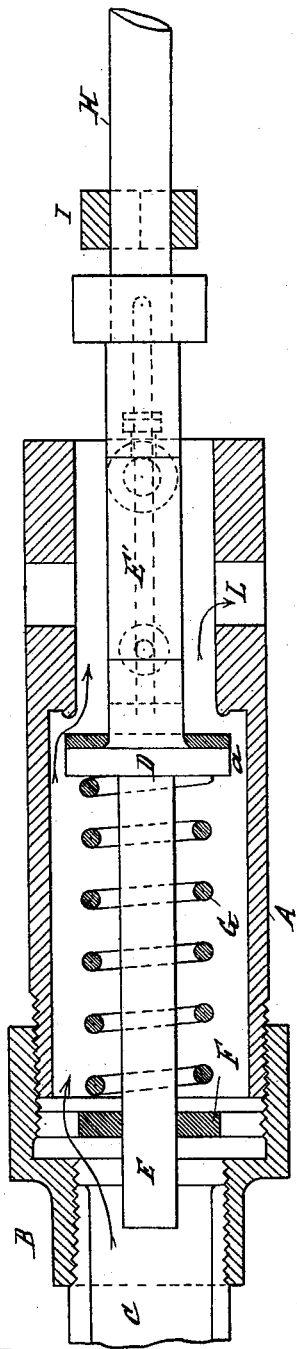
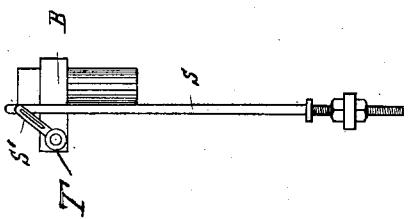
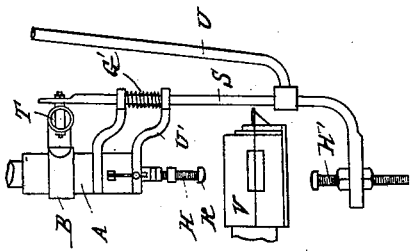
Witnesses:
Frank S. Ober
Geo. S. Kennedy
Inventor
Andre Cholodkowsky
by Wm A Rosenbaum
Atty.

UNITED STATES PATENT OFFICE.

ANDRÉ CHOLODKOWSKY, OF KIEW, RUSSIA.

BRAKE-ACTUATING DEVICE.

SPECIFICATION forming part of Letters Patent No. 633,228, dated September 19, 1899.

Application filed June 24, 1899. Serial No. 721,734. (No model.)

*To all whom it may concern:*

Be it known that I, ANDRÉ CHOLODKOWSKY, a subject of the Emperor of Russia, residing at Kiew, in the Empire of Russia, have invented certain new and useful Improvements in Brake-Actuating Devices, of which the following is a specification, and for which I have filed applications for foreign patents as follows: in Belgium January 16, 1899; in France January 16, 1899; in Germany January 20, 1899; in England, provisional protection, January 24, 1899; in Austria November 14, 1898, and in Hungary November 16, 1898.

This invention relates to apparatus suitable for use in connection with the air-pipes of the brakes of a railway-train for the purpose of automatically actuating the said brakes in case of an accident happening to the rolling-stock—such, for instance, as derailment or breakage of an axle.

My improved apparatus for this purpose according to this invention comprises a tubular body which is adapted to be screwed to a branch of the air-pipe of the brakes and in which there is arranged a valve that is normally kept closed by a suitable spring. The stem of this valve is extended through the end of the tubular body and is provided at its outer end with a screw adapted to be held in a selected position by means of a nut.

One or more of such apparatus is or are inserted in the brake-pipe of a vehicle—for example, above one or more axle-boxes or above the middle of a spring or springs—and the outer screw is so adjusted that any abnormal movement of the vehicle will cause the head of the screw of the or each such apparatus to strike against the axle-box or spring. This action will open the valve, and thereby automatically actuate the brakes. The valve when thus opened is kept in that position by a spring-stop which engages with teeth cut in the stem of the valve in such a manner that the brakes cannot be released until after the valve-stop has been disengaged by hand. In some cases the valve may also be combined with a cock normally kept closed by a spring and provided with a bar carrying a second screw adjusted under the axle-box in order to "record," so to speak, the downward abnormal movements of the axle-box.

Figure 1:
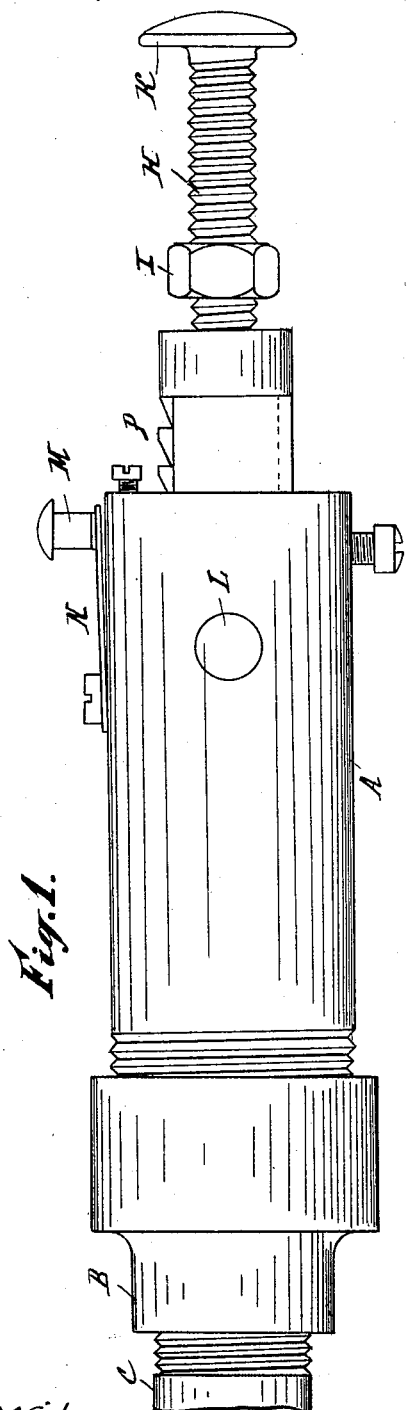
Figure 2:
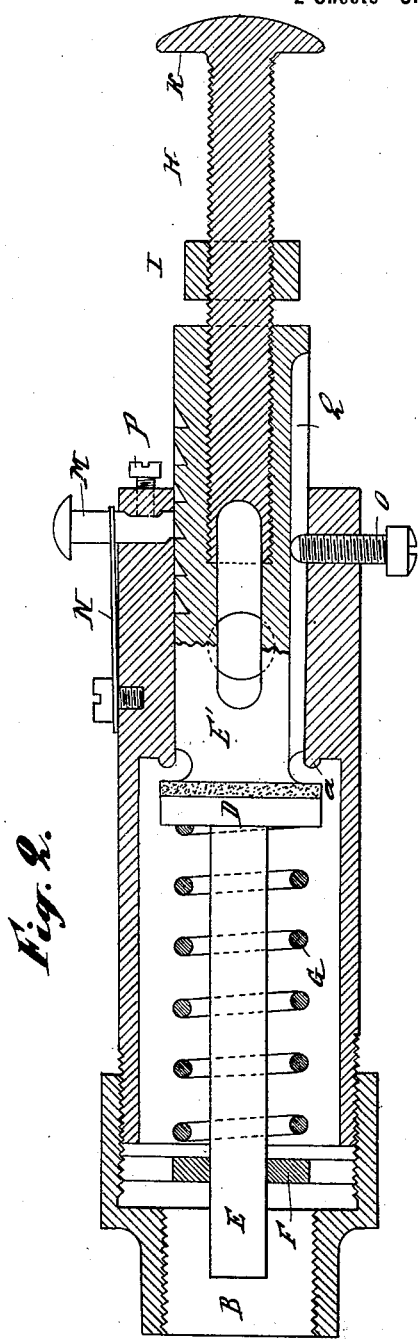

Referring to the annexed drawings, Figure 1 is a side view of an apparatus constructed according to my invention. Fig. 2 is a vertical section, and Fig. 3 a horizontal section, of the same apparatus. Fig. 4 shows as an example the combination of the said apparatus with an axle-box of a railway-vehicle, and Fig. 5 is a detail side elevation showing the connection between rod S and cock T of Fig. 4.

My improved apparatus comprises a tubular body A, which is screwed to a branch or union B of the brake air-pipe C. The tubular body A has a seat $a$ for the valve D, which is guided by a stem E, that works in a cross-piece F in the tubular body A or the branch or union B. The valve D is normally kept pressed against its seat $a$ by means of a coiled spring G, placed on the stem E between the valve D and the cross-piece F. The valve D is also provided with a spindle E', which extends through to the outside of the tubular body and in which fits a screw H, the length of whose externally-projecting portion can be regulated by means of a nut I, provided thereon. This screw H is provided at its outer end with a suitable head K, which strikes in the case of derailment, for example, against the surface of the axle-box V, Fig. 4, or against a piece screwed or bolted to the middle part of the spring. When a shock is produced in this way, the spring G is compressed and the valve D moved from its seat, allowing the air to pass through orifices L, formed in the tubular body A, and to escape or flow in, according to the kind of the air-brake employed. When the valve D is moved from its seat, it is kept open by a catch M, carried by a spring N and engaging with ratchet-teeth P, formed in the valve-spindle E, which is slotted to give free communication whenever the valve is open between the interior of the tubular body and the aforesaid apertures, a guide-screw O being provided in the tubular body, engaging in a groove Q in the spindle E' to keep the latter from rotating. The apparatus may be arranged, for example, as shown in Figs. 4 and 5, with the head K of the aforesaid screw H above an axle-box V and another and similar screw H' below the said box, this latter screw being connected by one or more suitable bars S, passing through guides U U' to slotted arms S' on a cock T, branched upon the union B or on the brake-pipe, the said cock T being adapted to give also free communication when in its open position between the interior of the pipe C and the outside. I also provide a spring G', fixed with one end to the connecting-bar S and with the other end to the guide U', the said spring acting normally so as to keep the cock T closed. If the screws H H' are suitably adjusted, the valve D and the cock T will remain closed so long as the relative position of the screws H H' and the axle-box V remain normal; but if in consequence of a derailment or from any other cause the axle or the body of the vehicle move suddenly one of the screws will strike the axle-box, and thus produce with certainty the automatic operation of the brakes by actuating either the valve D or the cock T.

I claim—

1. In combination a tubular body, a brake-pipe upon which the said body is screwed, a valve arranged in the said tubular body, a cock branched upon the brake-pipe, means adapted to keep the valve and the cock closed, a spindle extending from the valve to the outside, a screw fitting in said spindle, and adjusted above an axle-box and another screw adjusted under the said axle-box and connected by a bar to the cock branched upon the brake-pipe, for the purpose set forth.

2. In combination a tubular body, a brake-pipe upon which the said body is screwed, a valve arranged in the said tubular body, a seat for the valve in the tubular body, a stem working in a cross-piece as a guide for the valve, a spring placed on the said stem and pressing the valve against its seat, a slotted spindle extending through to the outside of the tubular body, means to keep the said spindle from rotating, a screw fitting in the said spindle, means for regulating the length of this screw, a cock branched upon the brake-pipe, a bar fitted with a screw and actuating said cock and means for guiding the bar and keeping the cock closed, for the purpose set forth.

In witness whereof I have hereunto set my hand in presence of two witnesses.

ANDRÉ CHOLODKOWSKY.

Witnesses:
   THOS. E. HEENAN,
   P. C. O'FLAHERTY.